United States Patent [19]

Courgeon

[11] Patent Number: 5,490,751
[45] Date of Patent: Feb. 13, 1996

[54] FASTENING DEVICE WITH REMOVABLE AXIAL GUIDING STOP

[75] Inventor: Jean-Claude Courgeon, Vendome, France

[73] Assignee: NACAM, Vendome, France

[21] Appl. No.: 1,614

[22] Filed: Jan. 8, 1993

[30] Foreign Application Priority Data

Jan. 10, 1992 [FR] France .................... 92 00225

[51] Int. Cl.⁶ .................................................. F16B 33/00
[52] U.S. Cl. .......................... 411/368; 411/371; 411/544
[58] Field of Search ................................. 411/368, 943, 411/532, 535, 539, 540, 544, 151, 157, 8, 9, 10, 11, 12, 13, 531, 371, 147, 136, 14, 1, 6, 7, 440, 441; 81/451, 452; 248/546, 547

[56] References Cited

U.S. PATENT DOCUMENTS

| | | | |
|---|---|---|---|
| 391,974 | 10/1888 | Hughes | 411/151 X |
| 1,229,623 | 6/1917 | Lambert | 411/10 X |
| 1,549,413 | 8/1925 | Greet | 81/452 |
| 2,234,557 | 3/1941 | Hungerford | 411/112 |
| 2,985,208 | 5/1961 | Hibbard et al. | 81/452 X |
| 3,351,111 | 11/1967 | Biddle | 81/452 |
| 3,408,891 | 11/1968 | Hartmann | 411/441 |
| 4,240,670 | 12/1980 | Zorn et al. | 411/157 X |
| 4,581,963 | 4/1986 | Kim | 81/452 |
| 4,719,828 | 1/1988 | Corsetti | 81/452 X |
| 4,958,970 | 9/1990 | Rose et al. | 411/544 X |
| 5,129,292 | 7/1992 | Albert | 411/441 X |
| 5,188,494 | 2/1993 | Hatin | 411/10 |

FOREIGN PATENT DOCUMENTS

| | | | |
|---|---|---|---|
| 482976 | 3/1974 | Australia | 248/547 |
| 0187498 | 7/1985 | European Pat. Off. . | |
| 2522572 | 9/1983 | France . | |
| 2732099 | 2/1978 | Germany . | |
| 2170744 | 8/1986 | United Kingdom | 81/452 |

Primary Examiner—Rodney M. Lindsey
Attorney, Agent, or Firm—Burns, Doane, Swecker & Mathis

[57] ABSTRACT

The fastening device is designed for assembling at least two elements (1, 2) one with respect to the other and consists of a system with a screw (3) and a nut (4). An axial removable guiding stop (5) is arranged between the external surface (7) of one of the elements (1) to be assembled and the head (32) of the screw (3) or the nut (4), which accommodates the tightening torque to bear against this external surface (7) after ejection of the guiding stop (5); whereas this guiding stop (5) ensures relative temporary and axial prepositioning so that the screw (3) or the nut (4) engages correctly into the nut (4) or the screw (3).

FIG. 13

Main application: Steering direction of an automotive vehicle

34 Claims, 4 Drawing Sheets

FASTENING DEVICE WITH REMOVABLE AXIAL GUIDING STOP

The invention relates to a fastening device for elements to be screwed together, with axial prepositional of the components of this fastening device and it applies more specifically to a motorized vehicle steering column.

Fastening with screws and nuts does not exhibit any difficulty when the working area is accessible, which allows easy positioning of the various components of the fastening device. Conversely, the situation becomes more complicated and may turn quite delicate, even impossible, because of the evolution of the production means, such as automation or robotization and also further to technical problems caused by miniaturization of the products to be assembled as well as by the lack of access calling for a "blind" assembly. In some of these configurations, the impossibility to position one of the components of the screw/nut system, i.e. the nut or the tapped section, or even in other applications, the screw head, calls for welding, crimping, glueing or nut cage fastening techniques. Moreover, in modern automotive vehicles, the space requirements decrease steadily for the various components and the manual or automated assemblies are generally mounted in a very reduced, delicate and fragile environment.

Another aspect of modern techniques is the lack of positioning accuracy of a robot, an automat or of blind assembly by the operator. Finally, miniaturization of the various elements to be driven requires higher precision when positioning these various elements during mounting and locking the fastening device.

Figure 1:
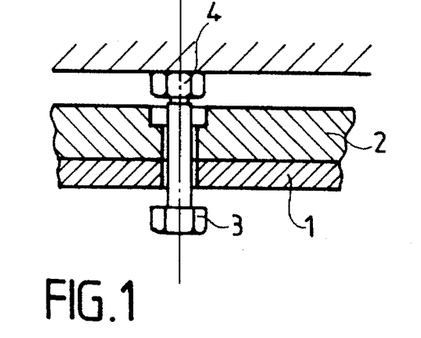
FIG. 1 is an axial cross-section view of a fastening device with screw and nut, designed for assembling two elements.

FIG. 1 represents a well-known fastening device, made up of a screw 3 and a nut 4 for the assembly of two elements 1 and 2. A housing has been arranged in the element 2 in order to accommodate the nut 4, which is a hardly accessible area or in the vicinity of a fragile or non-usable environment, represented on the Figure by hatchings. In spite of the housing of the nut 4 in its seat in order to ensure its axial position and to limit its rotation, the screw 3 cannot be well oriented with respect to the nut 4 when the screw is engaged when pushing the screw 3, one runs the risk of forcing the nut 4 out of its housing. In this case, the nut 4 is not guided any longer and cannot be locked in rotation, hence this nut 4 comes loose and gets lost in an inaccessible area.

Figure 2:
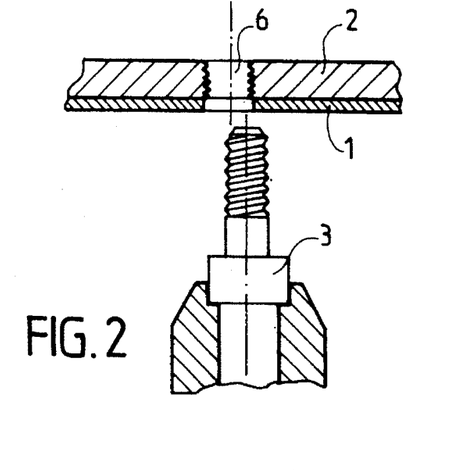
FIG. 2 is an axial cross-section view of a fastening device with screw and tapped section in one of the elements to be assembled.

The FIG. 2 represents a well-known fastening device, made up of a screw 3 designed for assembling two elements 1 and 2, whereas the screw 3 engages into a tapped section 6 in the element 2 to be assembled. In this type of assembly, which is performed in automotive construction, among others, by automatic machines, there is no screw guiding and correct positioning of this screw with respect to the fastening axis of both elements to be assembled 1 and 2. This type of assembly exhibits the disadvantage to present the screw incorrectly and risks to damage the element 1 as well as the tapped section 6 of the element 2.

Figure 3:
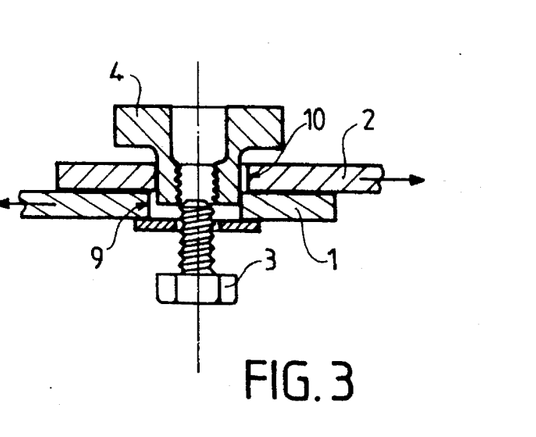
FIG. 3 is an axial cross-section view of a fastening device with screw and nut, designed for assembling two elements, both penetrated by this nut.

The FIG. 3 represents a well-known fastening device, made up of a screw 3 and a nut 4, which are mounted in two elements 1 and 2 in order to ensure their assembly. Each of the elements 1 and 2 possesses a through-hole, referred to respectively as 9 and 10, into which a cylindrical section of the nut 4 engages. In order to ensure the mounting, the screw 3 engages into the tapped section of the nut 4 which penetrates the hole 10 of the element 2 and the hole 9 of the element 1 until the nut leans against the surface of the element 2 to block and maintain the assembly together. In this well-known type of embodiment, and especially used in automatic assembly in manufacture lines for automotive vehicles, the screw 3 may be oriented incorrectly with respect to the fastening axis of the holes 9 and 10 and of the nut 4, and it may force out the nut 4 pre-engaged into these holes 9 and 10. There is then a risk of losing the nut 4 in a zone which can be fragile or inaccessible.

Figure 4:
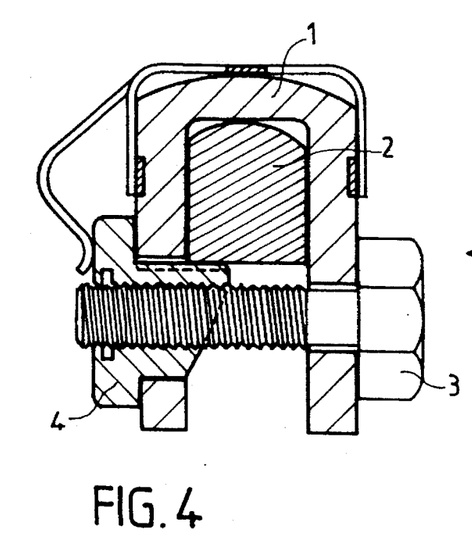
FIG. 4 is an axial cross-section view of a fastening device with screw and nut of an automotive steering column bracket to be assembled with a male element, integral with the steering box axle, whereas the assembly is represented after mounting and locking.
Figure 5:
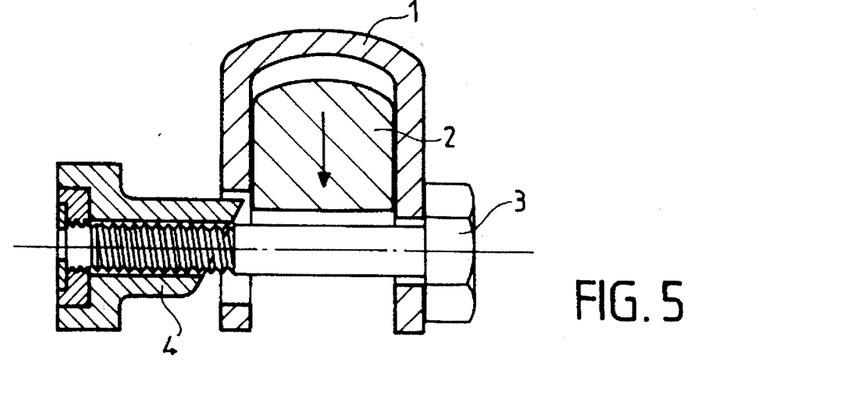
FIG. 5 is a similar view to FIG. 4, whereas the male element is badly positioned and the assembly is represented before locking.
Figure 6:
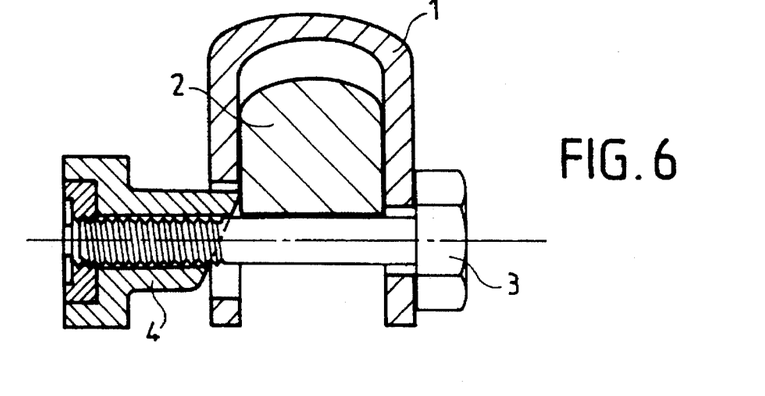
FIG. 6 is a similar view to FIG. 4, whereas the male element is badly positioned and the assembly is represented in locked position.

The FIGS. 4, 5 and 6 represent a well-known fastening device with screw 3 and nut 4, designed for assembling a bracket 1 with a male element 2 to be assembled. The bracket 1 is for instance integral with an automotive steering column and the male element to be assembled is integral with the steering box axle. In this type of assembly, the screw 3 penetrates into a hole provided in one of the legs of the bracket 1 and it engages into the tapped section 6 of the nut 4 which is mounted on the other leg of this bracket 1. The male element 2 engages inside this bracket 1 and its position is ensured at locking stop end by the screw 4 which engages under this male element 2. When this assembly is mounted correctly, we obtain the assembly represented in locked position on the FIG. 4. During assembly, the nut 4 is maintained in axial position by an appropriate device which may be a clip, as that illustrated on the FIG. 4 and it is locked in rotation by a special shape of the nut 4 working together with a bore drilled into the bracket 1. Generally because of the environment, the nut 4 is in a fragile or inaccessible zone, and the screw is blind mounted with respect to that nut 4. There is a risk of facing the case of the FIG. 5, where the screw 3 is badly positioned and thus forces the nut 4 out of its seat, which may displace the male element 2 to be assembled, which falls back following the direction of the arrow and leans against the stem of the screw 3. When locking, as illustrated on the FIG. 6, the male element to be assembled 2 remains against the stem of the screw 3 and the nut 4 leans against that male element 2 badly positioned, instead of sliding underneath that male element 2, in order to guarantee its correct positioning. We have a locked system, mounted in a downgraded way and the bracket 1 and the male element to be assembled 2 are in incorrect position one with respect to the other.

The purpose of this invention is to propose a fastening device with removable axial guiding stop, which avoids the disadvantages described above and which consists in causing relative, temporary and axial positioning of the elements to be linked; while this prepositioning is maintained for cases when a clumsy movement, whether manual or robot-controlled, should separate or displace excessively one or several elements to be assembled.

The invention relates thus to a fastening device designed for assembling at least two elements one with respect to the other and which is made up of a system with one screw and one nut, or with a screw and a tapped section in one of the elements to be assembled.

According to an essential characteristic of the invention, this device comprises a removable axial guiding stop arranged between the external surface of one of the elements to be assembled and the screw head or the nut, which accommodates the tightening torque to lean against this external surface so that:

in a first stage, the guiding stop ensure relative temporary and axial prepositioning so that the screw or the nut engages correctly into the nut or the screw;

and in a second stage, the screw or the nut penetrates into the screw or the nut until the fastening device is locked, whereas the penetration enabled by the thread exerts an axial force on the guiding stop which allows said guiding stop to clear the fastening device so that the screw head or the nut may lean against the external surface of the corresponding element to be assembled.

According to a preferred embodiment of the invention, the guiding stop contains a crown:
- whose centre bore is sized to allow passage of the screw stem,
- whose periphery of the external section has sizes larger then those of the screw head or the nut,
- and whose external surface against which bears the screw head or the nut, is conical in shape.

According to a first embodiment of the invention, the guiding stop shows an opening all over its axial length, so that under the action of the tightening torque, it opens and may go through the stem of the tightening screw or nut. Moreover, the guiding stop exhibits a notch on the periphery of the external section and arranged diametrically opposite the opening. According to the invention, the guiding stop may also have notches on the periphery of the external section and symmetrical with respect to the opening and in another variation of the invention, it may have notches diametrically opposite to each other. In order to improve the fool proof characteristic, and according to another variation of the invention, the guiding stop comprises two conical surfaces, symmetrical with respect to the radial centre plane of the longitudinal axis of this guiding stop. In order to suit some assembly variations of elements and, in one of these variations, the guiding stop presents the surface opposite to the external surface conical in shape, which comprises a cylindrical housing designed for engaging into a dimple of the corresponding element to be assembled. In another variation, the guiding stop exhibits an external surface conical in shape, which comprises a housing for accommodating the nut for the tightening torque.

According to a second embodiment of the invention, the centre section of the guiding stop has sizes larger than those of the screw head or the tightening nut, whereas this centre section has low mechanic characteristics with respect to those of the external section, so that under the action of the tightening torque, it is crushed and forced out towards the external section, which is thus ejected by passing through the screw head or the tightening nut.

According to a first assembly type of the invention, the stem of the screw goes through the guiding stop and the holes provided into the elements to be assembled, to engage into the nut maintained in position in a housing provided therefor.

According to a second assembly type of the invention, the stem of the screw goes through the holes drilled into the elements to be assembled, to engage into the guiding stop and into the nut; whereas the screw head is maintained in position in a housing provided in the corresponding element to be assembled and whereas the nut is mounted in a housing provided in the guiding stop.

According to a third assembly type of the invention, the stem of the screw goes through the guiding stop and the hole provided in the low thickness element to be assembled, to engage into the tapped section of the other element to be assembled; the element to be assembled against which the guiding stop leans, with a cylindrical dimple, concentric to the hole, so that the cylindrical seat of the guiding stop can engage into this cylindrical dimple.

According to a fourth assembly type of the invention, the stem of the screw goes through the guiding stop, a bearing washer of the first element to be assembled and a the hole provided into this element, in order to engage into the nut going through the hole of the second element to be assembled and engaging into the hole of the first element to be assembled, whereas the nut is maintained in position in both these holes.

A fifth assembly type of the invention comprises the following:
- an element to be assembled in the form of a U-section bracket, with two relatively parallel legs, linked by a bridge and integral with an automotive steering column;
- a male element to be assembled, engaging between the legs of the bracket, of non-circular section, exhibiting three flat surfaces and a cylindrical zone, whereas two flat surfaces are symmetrical with respect to the cylindrical zone and parallel to one another, in order to slide between the legs of the bracket, the third flat surface being perpendicular to both the others, the male element to be assembled is integral with the steering box axle;
- a hole provided in one the legs of the bracket and a housing provided in the other leg, whereas the hole and the housing are aligned with one another, the hole having sizes corresponding to the passage of the screw stem and aligned with the housing, whose sizes are larger to accommodate the nut support;
- the screw whose stem goes through the guiding stop and the hole in the corresponding leg of the bracket, engages into the nut whose support is mounted inside the housing of the corresponding leg of the bracket, whereas the nut support is maintained in position in this housing.

Preferably, the nut support comprises:
- a circular extremity with a flat surface which engages into the circular housing with a flat surface of corresponding sizes, wheres the flat surface of the circular extremity is applied under the third flat surface of the male element to be assembled at locking stop end;
- a body with sizes larger than the extremity, which accommodates the nut and leans at locking stop end against the external surface of the corresponding leg of the bracket, whereas the nut contains a nut brake.

In order to maintain the guiding stop during rotation, a rotation stop pin of the guiding stop is mounted in the leg of the bracket against which the guiding stop is applied, this rotation stop pin penetrates into the opening of the guiding stop, in order to control its direction when ejected during the locking phase.

According to another embodiment of the invention the rotation stop pin of the guiding stop is made up of an extension of a clip extremity, which penetrates into the opening of the guiding stop, in order to control its direction when ejected during the locking phase; this clip has the shape of a jaw to encompass the bracket and whose ends exhibits a dished surface leaning against the body of the nut support and whose other end leans against the external surface of the other leg of the bracket against which the guiding stop is leaning.

The fastening device according to the invention advantageously ensures relative temporary and axial prepositioning of the elements to be assembled, in order to guarantee this assembly in modern mounting types, whether automated or robot-controlled or in blind conditions. The device according to the invention thus allows to protect the preassembly from any clumsy movement, whether manual or robot-controlled, which might separate or excessively displace one of several elements to be assembled. These advantages are especially interesting in case when repositioning of these elements to be assembled in their standby position with the fastening system would prove difficult, let alone impossible, or when one of the elements to be assembled might reach a non-usable or fragile zone of the fastening device surrounding.

Other features and advantages of the invention will become apparent with the following description, given for exemplary purposes, in no way limitative, while referring to the enclosed drawings on which.

Figure 7:
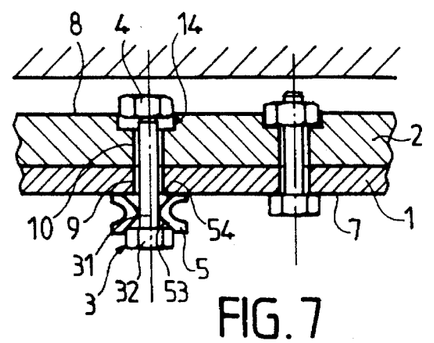
FIG. 7 is an axial cross-section view of a screw and nut fastening device with a guiding stop according to the invention.

An embodiment of the fastening device according to the invention is illustrated on FIG. 7. It comprises a screw 3 engaging into a nut 4, in order to assemble one with respect to the other, two elements referred to respectively as 1 and 2. According to an essential characteristic of the invention, this fastening device comprises an axial and removable guiding stop 5 arranged between the external surface 7 of the element 1 to be assembled and the head 32 of the screw 3. When locking this fastening device, the head 32 of the screw 3 accommodates the tightening torque in order to lean against the external surface of the element 1. To this end, the surface 8 of the element 2, opposite to the surface 7 of the element 1, comprises a housing 14 into which the nut 4 engages in order to maintain this nut 4 in rotation and axially in the opposite direction to the engaging screw 3.

This locking manoeuvre is performed in two stages:

a first stage, when the guiding stop 5 ensures relative temporary and axial prepositioning, so that the screw 3 engages correctly into the nut 4, which is maintained in rotation and axially in the housing 14;

and a second stage, where the screw 3 penetrates into the nut 4 which is still maintained in rotation during this second stage, in order to lock the fastening device.

The penetration of the screw 3 in the nut 4 applies onto the guiding stop 5 an axial force under the action of the thread. This axial force allows this guiding stop to clear the fastening device, so that the head 32 of the screw 3 leans against the external surface of the corresponding element to be assembled 1.

Figure 14:
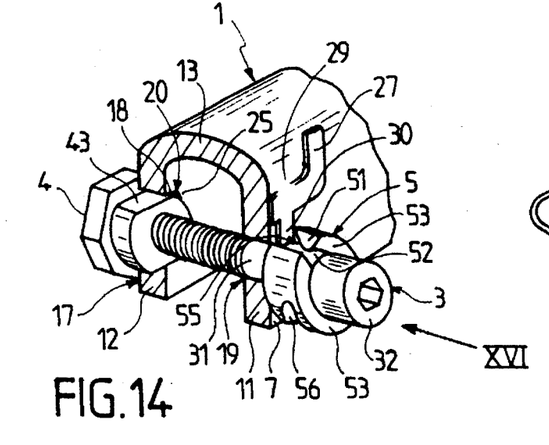
FIG. 14 is a detailed view of a cavalier projection of the fastening device represented on FIG. 13, the bracket is shown in cross-section and the assembly is represented before locking.
Figure 15:
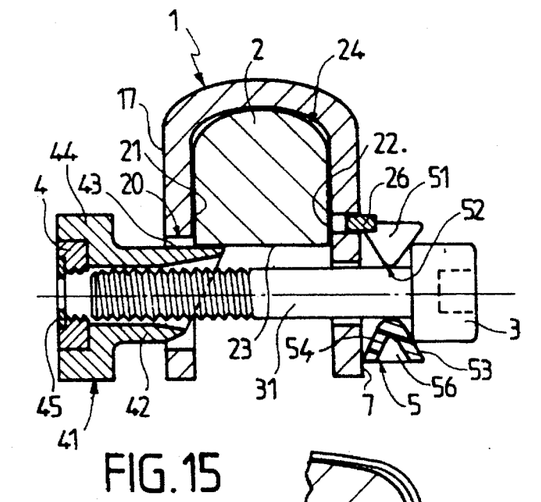
FIG. 15 is an axial cross-section of the fastening device illustrated on FIGS. 13 and 14 and comprising the variation of a rotation stop pin, the assembly being represented before locking.

The structure of the guiding stop 5 according to the invention is shown quite clearly on FIG. 14 where it is represented as a cavalier projection, as well as on the corresponding FIG. 15. In the embodiment represented on these Figures, the guiding stop 5 is made up of a crown 51, with a centre recess 52. This centre recess 52 has sizes large enough to allow passage of the stem 31 of the screw 3. Moreover, the periphery of the external section of this crown 51 must have sizes larger than those of the head 32 of the screw 3. This crown 51 possesses an external surface 53 and an internal surface 54, the head 32 of the screw 3 leaning against the external 53, whereas the internal surface 54 is applied to the surface 7 of the element to be assembled 1. Preferably, the external surface 53 and the internal surface 54 are conical in shape, symmetrical with respect to the centre radial plane of the longitudinal axis of this guiding stop 5. The guiding stop 5 also comprises an opening 55, configured over its whole axial length, so that under the action of the tightening torque applied to the screw 3, this guiding stop opens and may go through the stem 31 of the screw 3. When locking is completed, the guiding stop 5 which opened, has been ejected so that the screw 3 may be applied against the surface 7 of the leg 11. Besides, the guiding stop 5 exhibits a notch 56 provided at the periphery of the external section and arranged diametrically opposite the opening 55. In other embodiments non represented on the Figures, there may be several notches 56 symmetrical with respect to opening 55, whereas these notches may also be diametrically opposite to one another.

The invention also allows axial and temporary positioning which enables fastening the elements to be assembled in the case of a difficult and miniaturized environment. The guiding stop 5, priorly mounted on the screw 3, allows when inserting the screw 3, to limit its travel according to its longitudinal axis without preventing its rotation. The axial travel restriction prevents the screw 3 from forcing the nut 4 into the fragile or non-usable zone, i.e. it maintains the nut 4 in its housing 14, while allowing rotation of the screw 3 which can thus engage into the nut 4.

This configuration also enables troublefree rotation and consequently, the nut 4 to begin to engage with respect to the screw 3, beyond a certain axial tension caused by the bearing surfaces of both these elements coming together. Because of the peculiar shape of the external conical surface 53 of the guiding stop 5 and of at least a decrease in section because of the notch 56 and of the opening 55, the guiding stop 5 opens gradually and proportionally to the relative axial displacement between the screw 3 and the nut 4, in order to maintain continuous operation of the axial limit stop. At the end of travel, this guiding stop 5 reaches its maximal opening angle and becomes separated from the screw 3.

The selection of material for this guiding stop 5 leads to different operating modes.

With a brittle material, such as polystyrene, the guiding stop 5 is broken during the first screwing turn. This selection is possible if the nut 4 can have a long travel when bound to the screw 3. In case where the guiding stop 5 is elastic, such as polyacetal, the guiding stop does not break, but opens gradually in order to maintain the function of the axial limit stop and hence restrict continuously the axial movement of the nut 4.

The guiding stop 5 can be produced according to another embodiment, non represented on the Figure. In such a case, the guiding stop 5 has sizes larger than those of the head 32 of the screw 3. This centre part has low mechanical characteristics with respect to the mechanical characteristics of the external part. Thus, under the action of the tightening torque, the centre part is crushed and is forced out towards the external part, which can thus be ejected while going through the head of the screw of the fastening device.

Figure 8:
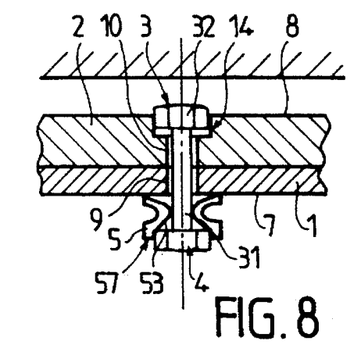
FIG. 8 is an axial cross-section view of another embodiment of the invention of a screw and nut fastening device with a guiding stop.

The fastening device according to the invention, represented on FIG. 8, comprises a screw 3 and a nut 4, which are designed for assembling elements 1 and 2. Each one of these elements 1 and 2 contains a passage hole, referred to respectively as 9 and 10, into which the stem 31 of the screw 3 engages. Unlike the system illustrated on the previous FIG. 7, in the present case, it is the screw 3 which is engaged from the inaccessible side into which the sensitive zone is represented by hatchings in the upper part of the Figure. To do so, the element 2 comprises, on its external side 8, a housing 14 which is designed for accommodating the head 32 of the screw 3. This housing is sized in order to maintain in rotation and axially this head 32. The screw 3 is thus mounted by engaging into the element 2, then penetrating into the element 1. The guiding stop 5 is thus engaged on the extremity of the stem 31 of the screw 3 to lean against the external surface 7 of the element to be assembled 1. It then suffices to mount the nut 4 in the extremity of the stem 31 of the screw 3 and to lock the assembly. The guiding stop 5 is constituted as the guiding stop described in the previous example represented on FIG. 7. Moreover, this guiding stop 5 comprises a centering housing 57 provided on its external conical surface 53. This centering housing 57 is designed for accommodating the nut 4 which receives the tightening torque during locking.

Figure 9:
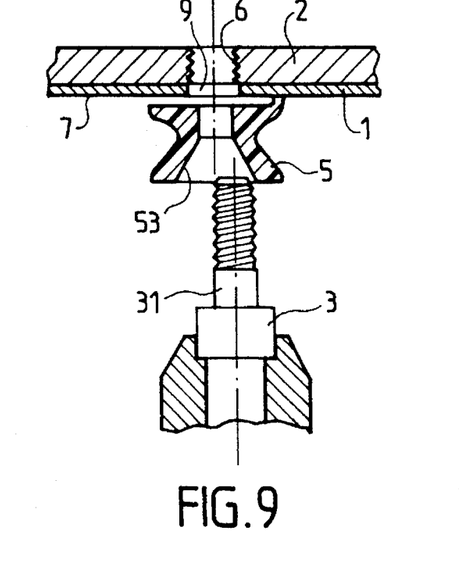
FIG. 9 is an axial cross-section view of a fastening device with screw and tapped section in one of the two elements to be assembled, with a guiding stop according to the invention.

The device according to the invention, represented on FIG. 9, comprises a screw 3 designed for assembling two elements 1 and 2 and which engaged into a tapped part 6 provided in the element 2. According to the invention, a guiding stop 5, analogical to the guiding stops described in the first example, is arranged on the external surface 7 side of the element to be assembled 1. Moreover, this guiding stop 5 is linked to this element 1 by a shearing section which comes loose when the guiding stop 5 opens, i.e. when applying the tightening torque at locking. With this type of assembly, the screw 3 is engaged via its stem 31 into the guiding stop 5 and into the hole 9 provided in the low thickness element 1 to be assembled, to finally engaged into the tapped section 6 provided in the other 2 to be assembled. In this other application of the invention, the guiding stop 5 is used simultaneously for axial prepositioning, as in the previous examples, and as temporary and removable chamfer, ensured by the conical external surface 53. According to the invention, we thus have the additional possibility to guide the screw 3, which is quite interesting in the case of a blind mounting or by a manipulator. This characteristic of the invention is also interesting in case where the positioning of the elements to be assembled 1 and 2 is inaccurate, for example, because of the dimensional dispersion in automotive structures.

Figure 10:
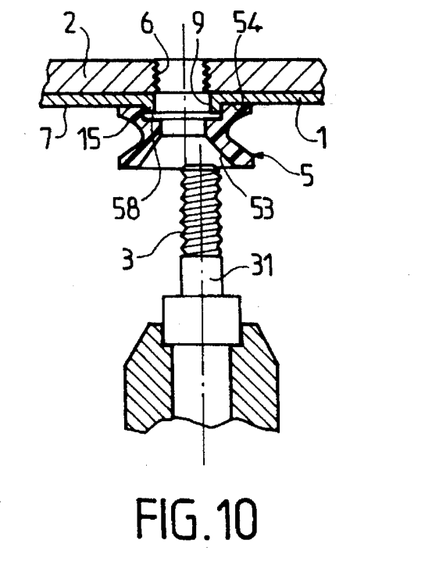
FIG. 10 is an axial cross-section view of another embodiment of the fastening device with screw and tapped section in one of the two elements to be assembled, with a guiding stop.

The device according to the invention, represented on FIG. 10, comprises a screw 3 designed for assembling two elements 1 and 2, which engages into a tapped section 6 provided in the element 2. The low thickness element 1 to be assembled possesses a passage hole 9 aligned with the tapered section 6 of the element 2. Moreover, this element 1 to be assembled possesses a cylindrical dimple 15 which is concentric to the hole 9. The guiding stop 5 whose structure is analogical to that described in the example of FIG. 7, comprises moreover a cylindrical housing 58 provided on its internal surface 54 and whose sizes correspond to the cylindrical dimple 15. To perform the assembly of the fastening device represented on FIG. 10, it suffices to engage the guiding stop 5 on the cylindrical dimple 15 of the element 1 via its cylindrical housing 58 and then to present the screw 3 which goes through this guiding stop 5 and the hole 9 provided in the low thickness element 1 to be assembled, to engage into the tapped section 6 provided in the element 2. During this locking manoeuvre, the guiding stop 5 is maintained in rotation and axially by an appropriate device.

Figure 11:
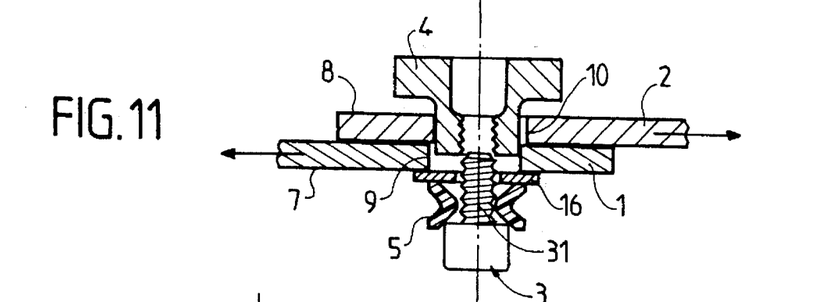
FIG. 11 is an axial cross-section view of a screw and nut fastening device designed for assembling two elements, which are both penetrated by this nut, the assembly being represented before locking.
Figure 12:
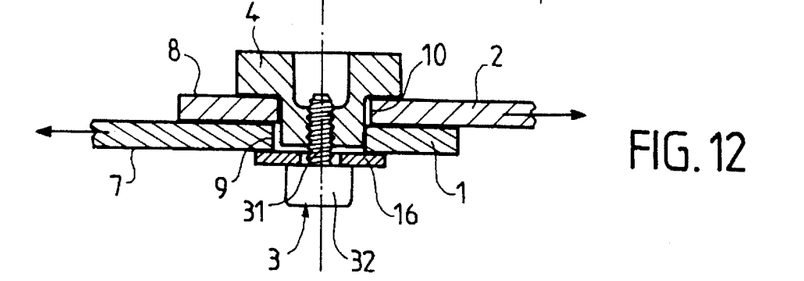
FIG. 12 is an analogical view to FIG. 11, the assembly being represented in locked position.

The device according to the invention, represented on FIGS. 11 and 12, comprises a screw and a nut 4 which are designed for ensuring the assembly of both elements 1 and 2. Each one of the elements 1 and 2 possesses a hole, referred two respectively as 9 and 10 designed for accommodating the nut 4. This nut 4 is arranged on the element 2 to be assembled side and it penetrates successively into the hole 10 of this element 2 and into the hole 9 of the element 1. A bearing washer 16 and a guiding stop 5 of a structure analogical to that described on FIG. 7 are arranged opposite the surface 7 side of the element to be assembled 1. The screw 3 goes through its guiding stop 5 via its stem 31, as well as the bearing washer 16, in order to engage into the nut 4 which is maintained in rotation and axially. FIG. 11 represents the device of the invention at the beginning of the fastening manoeuvre of the device, whereas FIG. 12 represents the same device in locked position, i.e. when the guiding stop 5 has been ejected and the head 32 of the screw 3 has engaged on the bearing washer 16 against the external surface 7 of the element 1. This embodiment underlines another characteristic of the invention which, using the guiding stop 5, enables to restrict the travel of the nut 4 which positions two elements or n elements, whereas these elements are subject to forces according to the directions of the arrows represented on the Figures. These stresses would consequently modify the relative positioning of the elements 1 and 2, if the nut 4 should come loose from one of these elements 1 and 2, at least.

The fastening device according to the invention, represented on FIGS. 13 to 18, relates to a screw 3 and to a nut 4 which are designed for locking together an element to be assembled in the form of a bracket 1, with a male element to be assembled 2. In the case represented on these Figures, the bracket 1 is integral with an automotive steering column and the male element 2 to be assembled is bound to the steering box axle. In this configuration, the element to be assembled in the form of a bracket 1 has a U-shaped section possessing two legs 11 and 12, which are substantially parallel one with respect to the other and which are linked by a bridge 13. The male element 2 to be assembled engages between the legs 11 and 12 of this bracket 1. This male element 2 to be assembled has a non-circular section and possesses three flat surfaces referred as 21, 22 and 23 as well as a cylindrical section 24. According to this embodiment, the two flat surfaces 21 and 22 are arranged symmetrically with respect to the cylindrical section 24 and they are parallel one with respect to the other, in order to slide between the legs 11 and 12 of the bracket 1. The third flat surface 23 is perpendicular to the other two flat surfaces 21 and 22.

Figure 13:
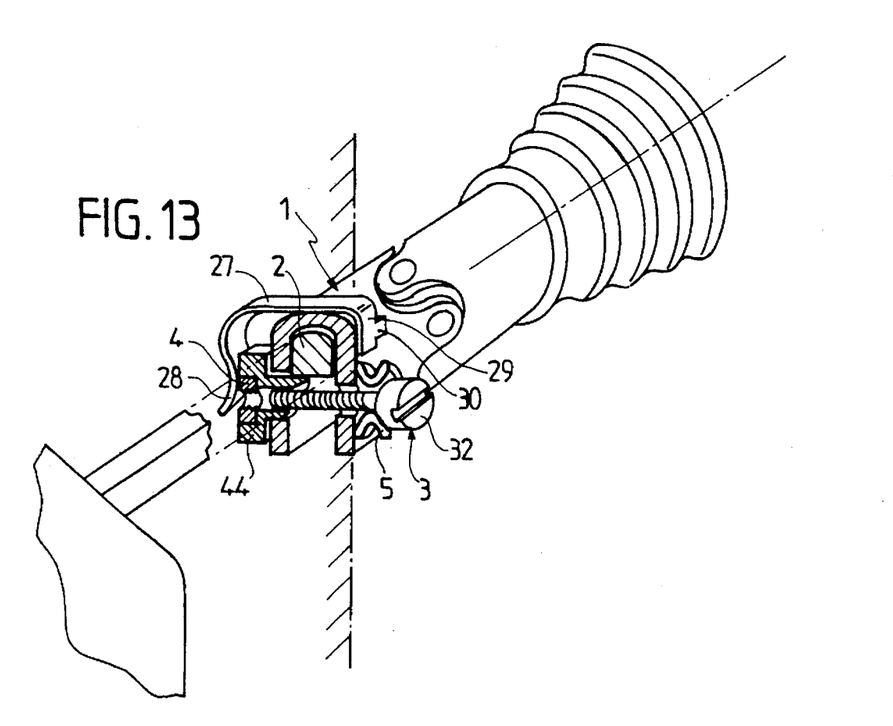
FIG. 13 is a cavalier projection with partial axial cross-section of a screw and nut fastening device with guiding stop of a steering column axle bracket with the male element of the steering bow axle, the assembly being represented before locking.

A hole 19 is provided in the leg 11 of the bracket 1 and a seat 20 is machined in the leg 12. The hole 19 has sizes corresponding to the passage of the stem 31 of the screw 3 and it is aligned with the housing 20 which has larger sizes in order to correspond to the sizes of the support 41 of the nut 4. A guiding stop 5 of a structure analogical to that described on FIG. 7 is arranged on the external surface 7 side of the leg 11 of the bracket 1. The screw 3 is engaged into the guiding stop 5 via its stem 31 and it goes through the hole 19 of the leg 11 of the bracket in order to engage into the nut 4 whose support 41 is mounted in the housing 20 of the corresponding leg 12 of the bracket 1. The nut support 41 is maintained in rotation and axially in this housing 20. To do so, a clip 27 is mounted on the device. This clip 27 has the form of a jaw and it encompasses the bracket 1. One of the extremities of this clip 27 exhibits a dished surface 28 which is applied against the nut 4 or the nut support 41. The other extremity 29 of this clip 27 bears against the external surface 7 of the other leg 11 of the bracket 1, with which the guiding stop 5 engages. In addition to the axial retention of the nut 4 ensured by the clip 27, this nut 4 is maintained in rotation by the configuration of the housing 20 with the support 41 of the nut 4. To do so, this support 41 of the nut 4 comprises a circular extremity 42 and a body 44. The circular extremity 42 is fitted with a flat surface 43 which engages into the circular housing 20 which possesses a flat surface 18 of corresponding size. Thus, this circular extremity 42 is mounted in a cylindrical section 25 of the housing 20, whereas the flat surface 43 of this circular extremity 42 works together with the flat surface 18 of the housing 20. Moreover, the flat surface 43 is sized in order to be applied under the third flat surface 23 of the male element to be assembled at locking stop end. Moreover, the body 44 comprises the nut 4 which is of larger size than the circular extremity 42. This body 44 accommodates the nut 4 and it is applied at locking stop end against the external surface 17 of the corresponding 12 of the bracket 1.

The nut 4 contains a nut brake 45 in order to improve the characteristics of the fastening device.

To ensure the assembly, first mount the nut 4 into the bracket 1 and arrange the clip 27 on this bracket 1. Afterwards, the screw 3 can be engaged via its stem 31 through the guiding stop 5 which is applied against the surface 7 of the leg 11 of the bracket 1, in order to engage the stem 31 into the nut 4.

Figure 16:
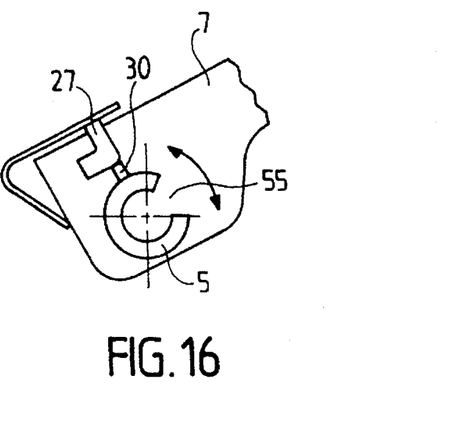
FIG. 16 is a view according to XVI of FIG. 14 represented before correct positioning of the guiding stop.
Figure 17:
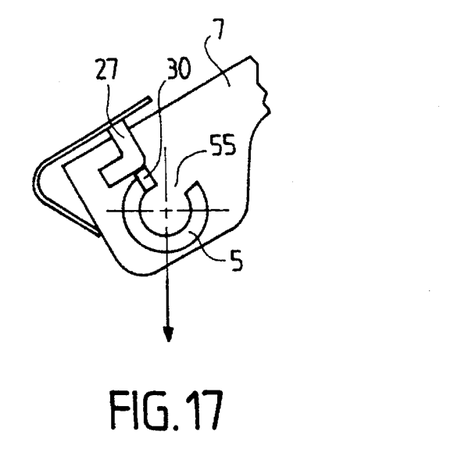
FIG. 17 is a view analogical to FIG. 16 whereas the guiding stop is positioned correctly.
Figure 18:
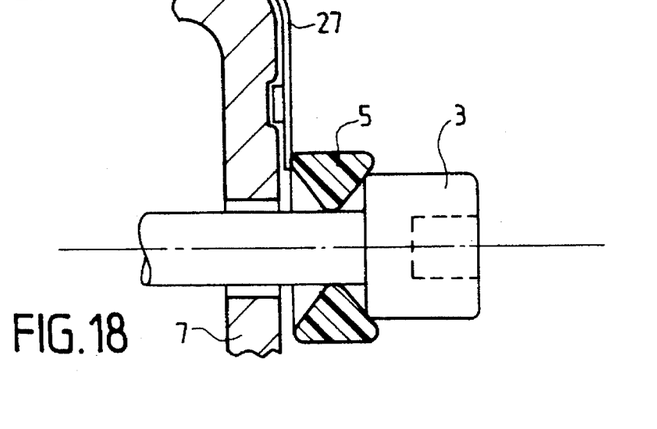
FIG. 18 is a partial axial cross-section of the fastening device represented on FIGS. 13 and 14 relating to stopping the rotation of the guiding stop.

In order to improve further the device of the invention, a rotation stop pin of the guiding stop 5 can be provided which enables to direct this guiding stop 5 in order to ensure a correct ejection direction. To do so, the guiding stop 5 rotation stop pin is constituted by an extension 30 of the extremity 29 of the clip 27, which penetrates into the opening 55 of the guiding stop 5 in order to control its ejection at locking. Another rotation stop pin system is represented on FIG. 15 and it consists in a rotation stop pin 26 mounted inside the leg 11 of the bracket 1 on which the guiding stop is leaning. This rotation stop pin 26 penetrates into the opening 55 of the guiding stop 5 which is oriented to ensure an appropriate direction of its ejection at locking. According to the embodiment of the rotation stop pin represented on FIGS. 14, 16 and 17, it can be seen that the guiding stop 5 must be oriented correctly during assembly, whereas FIG. 16 shows the guiding stop 5 before correct positioning and the FIG. 17 shows the correct position of this guiding stop 5, into which the extremity 30 of the clip 27 penetrates into the opening 55.

The embodiment of the invention represented on FIGS. 13 to 18 illustrates characteristics aiming at making the blind assembly of a steering box axle more reliable with the extremity bracket of an automotive steering column. In case where the screw 3 were positioned too quickly by the operator, there could be a relief of the nut 4 with respect to the internal surface of the leg 12 of the bracket 1, as it has been represented on FIGS. 5 and 6. As one of the elements to be assembled can be actuated by some force caused by the stress exerted by a cowl joint of sufficient stiffness to displace of the elements 1 and 2, it may happen that these elements to be assembled are positioned according to the configuration of FIGS. 5 and 6. In the latter configuration, the operator, after applying the necessary tightening torque, will not be certain of having safety mounting conditions. The screw 3 will not engage into the nut 4 sufficiently and the nut brake 45 will not be actuated. Moreover, the steering box axle will not press against the circular zone of the bridge 13, linking the legs 11 and 12 of the bracket 1. These bad quality points would obviously and in the short term, lead to the loss of direction by the vehicle and such a situation is not acceptable. Indeed, the elements to be assembled 1 and 2 would not be aligned any longer and, consequently, there would be stresses in the system at each rotation, which in the long run would degrade the direction transmission.

The reference signs inserted after the technical characteristics mentioned in the claims aim at facilitating the understanding of the said and do not restrict their extent whatsoever.

I claim:

1. Fastening device for assembling at least two elements, the fastening device comprising:

a screw including a head and a threaded stem, the head being arranged proximate a first external surface of a first one of the elements to be assembled;

a nut including internal threads for engaging with the stem of the screw, the nut being arranged proximate a second external surface of a second one of the elements to be assembled;

removable guiding stop means, arranged between the first external surface and the head of the screw, for providing, in a first stage, axial prepositioning of the screw and the nut and for permitting, in a second stage, penetration of the threaded stem of the screw into the internal threads of the nut through torquing of the screw and the nut, the guiding stop means having an axial opening through which the stem of the screw extends and through which the head of the screw is prevented from passing, an axial force exerted on the guiding stop means during torquing of the screw and the nut causing the guiding stop means to clear the screw so that the head of the screw engages with the first external surface of the first one of the elements to be assembled; and the guiding stop means having a length from one end to another, the first and second elements to be assembled have a thickness, and the stem of the screw having a length, the length of the guiding stop means, the thickness of the first and second elements to be assembled, and the length of the screw being such that, when the stem of the screw extends through the guiding stop means and the head of the screw abuts against one end of the guiding stop means, and the stem of the screw extends through the first and second elements to be assembled, a leading thread of the screw mates with a leading thread of the nut.

2. Fastening device according to claim 1, wherein the guiding stop means includes an external top surface larger than an external periphery of the head of the screw, the guiding stop means having an external side surface, the external side surface being conical in shape.

3. Fastening device according to claim 2, wherein an axially central section of the guiding stop means is larger than a periphery of the head of the screw and possesses lower mechanical strength than an axially external section of the guiding stop means, the central section, upon torquing of the screw and the nut, being crushed and forced outside towards the external section so that the external section and the crushed central portion are removable around the head of the screw.

4. Fastening device according to claim 2, wherein the guiding stop means includes a longitudinal opening extending from the axial opening to the external side surface of the guiding stop means along an axial length of the guiding stop means, the longitudinal opening widening, upon torquing of the screw and the nut, to permit the guiding stop means to clear the screw.

5. Fastening device according to claim 4, wherein the guiding stop means includes a notch provided at the external side surface of the guiding stop means and arranged diametrically opposite the longitudinal opening.

6. Fastening device according to claim 4, wherein the guiding stop means includes notches provided at the external side surface of the guiding stop means and arranged symmetrically with respect to the longitudinal opening.

7. Fastening device according to claim 6, wherein the notches on the guiding stop means are arranged diametrically opposite one another.

8. Fastening device according to claim 2, wherein the guiding stop means further has a second external side surface at an opposite end of the guiding stop means from the external side surface, the second external side surface being conical in shape, the conical shapes of the external side surface and the second external side surface being symmetrical with respect to a longitudinal axis of the guiding stop means.

9. Fastening device according to claim 2, wherein the guiding stop means is provided with a cylindrical recess, provided in an external bottom surface of the guiding stop, for receiving a dimple formed on the first external surface.

10. Fastening device for assembling at least two elements, the fastening device comprising:

a screw including a head and a threaded stem, the head being arranged proximate a first external surface of a first one of the elements to be assembled;

a nut including internal threads for engaging with the stem of the screw, the nut being arranged proximate a second external surface of a second one of the elements to be assembled;

removable guiding stop means, arranged between the first external surface and the nut, for providing, in a first stage, axial prepositioning of the screw and the nut and for permitting, in a second stage, penetration of the threaded stem of the screw into the internal threads of the nut through torquing of the screw and the nut, an axial force exerted on the guiding stop means during torquing of the screw and the nut causing the guiding stop means to clear the nut so that the nut engages with the first external surface of the first one of the elements to be assembled, the guiding stop means including an axial opening, the axial opening being of sufficient size to permit the stem of the screw to extend therethrough and to prevent passage of the nut therethrough, and an external top surface larger than an external periphery of the nut, the guiding stop means having an external side surface, the external side surface being conical in shape; and the guiding stop means having a length from one end to another, the first and second elements to be assembled have a thickness, and the stem of the screw having a length, the length of the guiding stop means, the thickness of the first and second elements to be assembled, and the length of the screw being such that, when the stem of the screw extends through the guiding stop means and the head of the screw abuts against the second external surface and the nut abuts against the external side surface of the guiding stop means, and the stem of the screw extends through the first and second elements to be assembled, a leading thread of the screw mates with a leading thread of the nut, wherein the guiding stop means is provided with a centering housing, provided in the external top surface of the guiding stop means, for accommodating the nut.

11. Fastening arrangement for assembling at least two elements, the fastening device comprising:

first and second elements to be assembled;

a screw including a head and a threaded stem, the head being arranged proximate a first external surface of the first one of the elements to be assembled, the first and second elements each having holes formed therein through which the stem of the screw extends;

a nut including internal threads for engaging with the stem of the screw, the nut being arranged proximate a second external surface of the second one of the elements to be assembled;

removable guiding stop means, arranged between the first external surface and the head of the screw, for providing, in a first stage, axial prepositioning of the screw and the nut and for permitting, in a second stage, penetration of the threaded stem of the screw into the internal threads of the nut through torquing of the screw and the nut, an axial force exerted on the guiding stop means during torquing of the screw and the nut causing the guiding stop means to clear the screw so that the head of the screw engages with the first external surface of the first one of the elements to be assembled, the guiding stop means including an axial opening, the axial opening being of sufficient size to permit the stem of the screw to extend therethrough and to prevent passage of the head of the screw therethrough, and an external top surface larger than an external periphery of the head of the screw, the guiding stop means having an external side surface, the external side surface being conical in shape;

the guiding stop means having a length from one end to another, the first and second elements to be assembled have a thickness, and the stem of the screw having a length, the length of the guiding stop means, the thickness of the first and second elements to be assembled, and the length of the screw being such that, when the stem of the screw extends through the guiding stop means and the head of the screw abuts against the external side surface of the guiding stop means, and the stem of the screw extends through the first and second elements to be assembled, a leading thread of the screw mates with a leading thread of the nut; and the second external surface of the second one of the elements to be assembled being provided with a housing for limiting axial and rotational movement of the nut.

12. Fastening device for assembling at least two elements, the fastening device comprising:

first and second elements to be assembled;

a screw including a head and a threaded stem, the head being arranged proximate a first external surface of the first one of the elements to be assembled, the first and second elements each having holes formed therein through which the stem of the screw extends;

a nut including internal threads for engaging with the stem of the screw, the nut being arranged proximate a second external surface of the second one of the elements to be assembled;

removable guiding stop means, arranged between the first external surface and the nut, for providing, in a first stage, axial prepositioning of the screw and the nut and for permitting, in a second stage, penetration of the threaded stem of the screw into the internal threads of the nut through torquing of the screw and the nut, an axial force exerted on the guiding stop means during torquing of the screw and the nut causing the guiding stop means to clear the nut so that the nut engages with the first external surface of the first one of the elements to be assembled, the guiding stop means including an axial opening, the axial opening being of sufficient size to permit the stem of the screw to extend therethrough and to prevent passage of the nut therethrough, and an external top surface larger than an external periphery of the nut, the guiding stop means having an external side surface, the external side surface being conical in shape, the guiding stop means being provided with a centering housing, provided in the external top surface of the guiding stop means for accommodating the nut;

the guiding stop means having a length from one end to another, the first and second elements to be assembled have a thickness, and the stem of the screw having a length, the length of the guiding stop means, the thickness of the first and second elements to be assembled, and the length of the screw being such that, when the stem of the screw extends through the guiding stop means and the head of the screw abuts against the second external surface and the nut abuts against the external side surface of the guiding stop means, and the stem of the screw extends through the first and second elements to be assembled, a leading thread of the screw mates with a leading thread of the nut; and the first external surface of the first one of the elements to be assembled being provided with a housing for limiting axial and rotational movement of the screw.

13. Fastening device according to claim 4, wherein the guiding stop means further includes a shearing section for contacting the first external surface of the first one of the elements to be assembled such that axial and rotational movement of the guiding stop is limited.

14. Fastening device according to claim 9, wherein the cylindrical recess is sized to engage with the cylindrical dimple such that axial and rotational movement of the guiding stop means is limited.

15. Fastening device according to claim 4, wherein the nut is maintained in place, rotationally and axially, in first and second holes formed, respectively, in the first and second ones of the elements to be assembled, the fastening device further including a bearing washer provided adjacent the external surface of the first one of the elements to be assembled, the bearing washer having an external periphery larger than an external periphery of the first hole and an internal opening, arranged around the first hole, the internal opening being larger than the stem of the screw and smaller than both the head of the screw and an external bottom surface of the guiding stop means, the stem of the screw extending, successively, prior to torquing of the screw and the nut, through the guiding stop means and the internal opening of the bearing washer such that the screw and the nut are axially prepositioned.

16. Fastening arrangement, comprising:

a screw including a head and a threaded stem;

a nut including internal threads for engaging with the stem of the screw;

a removable guiding stop including an axial opening, the axial opening being of sufficient size to permit the stem of the screw to extend therethrough and to prevent the head of the screw from passing therethrough, and an external top surface larger than an external periphery of the head of the screw;

a U-shaped bracket element having first and second legs linked by a bridge, the first and second legs having, respectively, first and second axially aligned holes through which the stem of the screw extends;

first means, associated with the first leg, for limiting axial movement of the screw relative to the first hole;

second means, associated with the second leg, for limiting axial and rotational movement of the nut relative to the second hole;

a male element for being attached between the legs of the bracket element, the male element being of non-circular section and possessing two opposed exterior surfaces, the two opposed surfaces being slidable between the legs of the bracket, the male element further including a third surface; and the guiding stop providing, in a first stage, axial prepositioning of the screw and the nut, the guiding stop being deformable, during torquing of the screw and the nut, to clear the head of the screw and permit, in a second stage, penetration of the threaded stem of the screw into the internal threads of the nut, engagement between the head of the screw and the first limiting means, and engagement between the nut and the second limiting means, the male element being retained between the legs of the bracket element in the second stage and, the guiding stop having a length from one end to another, the bracket element having a thickness, and the stem of the screw having a length, the length of the guiding stop, the thickness of the bracket element, and the length of the screw being such that, when the stem of the screw extends through the guiding stop and the head of the screw abuts against one end of the guiding stop, and the stem of the screw extends through the bracket element, a leading thread of the screw mates with a leading thread of the nut.

17. Fastening device according to claim 16, wherein the limiting means includes an extended portion, the extended portion extending through the second hole and being non-rotatable relative thereto, the extended portion extending beneath the third surface of the male element the second limiting means further including a body portion having an exterior periphery larger than the extended portion, the body portion contacting an external surface of the second leg and having a larger exterior periphery than an exterior periphery of the second hole, the second limiting means including an axial passage through which the threaded stem of the screw extends.

18. Fastening device according to claim 17, further comprising a nut brake.

19. Fastening device according to claim 16, further comprising a rotation stop pin mounted in the first leg, wherein the guiding stop includes a longitudinal opening extending from the axial opening to an external side surface of the guiding stop along an axial length of the guiding stop, the longitudinal opening widening, upon torquing of the screw and the nut, to permit clearing of the guiding stop, the rotation stop pin being received in the longitudinal opening of the guiding stop and causing the guiding stop to clear the head of the screw by being ejected from between the head of the screw and the first leg on a side of the screw opposite the rotation stop pin.

20. Fastening device according to claim 16, further comprising a U-shaped clip clipped around the first and second legs and the bridge of the bracket, the clip having a first extremity having a dished surface contacting the second limiting means to maintain the second limiting means in position relative to the second leg, the clip having a second extremity contacting an external surface of the first leg.

21. Fastening device according to claim 20, further comprising a rotation stop pin extending from the clip, the guiding stop including a longitudinal opening extending from the axial opening to an external side surface of the guiding stop along an axial length of the guiding stop, the longitudinal opening widening, upon torquing of the screw and the nut, to permit clearing of the guiding stop, the rotation stop pin being received in the longitudinal opening of the guiding stop and causing the guiding stop to clear the head of the screw by being ejected from between the head of the screw and the first leg on a side of the screw opposite the rotation stop pin.

22. Fastening device according to claim 16, wherein the bracket element forms part of an automotive steering column and the male element forms part of a steering box axle.

23. A system for fastening a headed screw to a nut, wherein a head of the screw is disposed on an opposite side of a workpiece from the nut and a threaded end of the screw extends through an opening in the workpiece, comprising:

a workpiece having an first opening extending through the workpiece, the workpiece having a first thickness;

a nut having an internally threaded second opening, the internally threaded second opening having a first length and a leading end;

means for positioning the nut relative to the first opening;

a screw having a threaded end adapted to extend through the first opening and a head that is larger than the first opening, the threaded end being of a second length, the second length being sufficient for the threaded end to extend through the workpiece and engage with the internally threaded second opening of the nut over the entire first length; and a guiding stop having a first end and a second end and a third opening extending from the first end to the second end through which the threaded end of the screw extends, the third opening being smaller than the head, the guiding stop being of a sufficient length, from the first end to the second end, such that, when the nut is positioned relative to first opening by the positioning means, and the threaded end of the screw is extended through the third opening and the first opening, a leading end of the threaded end of the screw engages correctly with the leading end of the internally threaded second opening of the nut, wherein, when a tightening torque is applied to the screw engaged correctly with the leading end of the internally threaded second opening of the nut, the guiding stop yields to permit engagement of the entire first length of the internally threaded second opening of the nut by the screw.

24. A guiding stop for a fastening arrangement including a screw having a threaded stem and a head and a nut having an opening with internal threads, the guiding stop comprising:

an external top surface for contact with one of the nut and the head of the screw; and a body having an axial opening through which the stem of the screw is adapted to extend and through which the contacting one of the nut and the head of the screw is prevented from passing, the guiding stop permitting, prior to torquing of the screw and the nut, axial prepositioning of the screw and the nut, the guiding stop, upon application of an axial force to the guiding stop, clearing the screw to permit penetration of the threaded stem of the screw into the internal threads of the nut, wherein the guiding stop has a length from one end to another, the length of the guiding stop bearing a relationship to a length of the screw with which it is used such that, when the stem of the screw extends through the guiding stop and the head of the screw abuts against one end of the guiding stop, and the stem of the screw extends through a workpiece to be assembled by the screw and the nut, a leading thread of the screw mates with a leading thread of the nut.

25. The guiding stop as set forth in claim 24, further comprising an axial central section and an axial external section, the central section being larger than a periphery of the one of the nut and the head of the screw, having lower mechanical strength than the external section, and, upon application of the axial force to the guiding stop, permitting the guiding stop to clear the screw by being crushed and being forced outside toward the external section so that the external section and the crushed central portion are removable around the one of the nut and the head of the screw.

26. The guiding stop as set forth in claim 24, wherein a longitudinal opening extends from the axial opening to an external side surface of the guiding stop, the longitudinal opening widening, upon application of the axial force to the guiding stop, to permit the guiding stop to clear the screw.

27. The guiding stop as set forth in claim 26, wherein one or more notches are provided on the external side surface of the guiding stop.

28. The guiding stop as set forth in claim 26, wherein a notch is provided on the exterior external side surface of the guiding stop diametrically opposite to the longitudinal opening.

29. The guiding stop as set forth in claim 26, wherein notches are provided on the external side surface of the guiding stop, the notches being arranged symmetrically with respect to the longitudinal opening.

30. The guiding stop as set forth in claim 24, wherein the guiding stop includes a first and a second external side surface at opposite ends of the guiding stop, the first and the second external side surfaces, both being conical in shape.

31. The guiding stop as set forth in claim 30, wherein the conical external side surface and the conical second external side surface are symmetrical with respect to a longitudinal axis of the guiding stop.

32. A fastening device, comprising:

a screw having a threaded stem and a head;

a nut having an opening with internal threads; and a guiding stop, the guiding stop including an external top surface for contact with one of the nut and the head of the screw, and a body having an axial opening through which the stem of the screw is adapted to extend and through which the contacting one of the nut and the head of the screw is prevented from passing, the guiding stop permitting, prior to torquing of the screw and the nut, axial prepositioning of the screw and the nut, the guiding stop, upon application of an axial force to the guiding stop, clearing the screw to permit penetration of the threaded stem of the screw into the internal threads of the nut, wherein the guiding stop has a length from one end to another, and the screw has a length, the length of the guiding stop bearing a relationship to the length of the screw with which it is used such that, when the stem of the screw extends through the guiding stop and the head of the screw abuts against one end of the guiding stop, and the stem of the screw extends through a workpiece to be assembled by the screw and the nut, a leading thread of the screw mates with a leading thread of the nut.

33. The fastening device as set forth in claim 32, wherein the guiding stop further includes an axial central section and an axial external section, the central section being larger than a periphery of the one of the nut and the head of the screw, having lower mechanical strength than the external section, and, upon application of the axial force to the guiding stop, permitting the guiding stop to clear the screw by being crushed and being forced outside toward the external section so that the external section and the crushed central portion are removable around the one of the nut and the head of the screw.

34. The fastening device as set forth in claim 32, wherein a longitudinal opening extends from the axial opening to an external side surface of the guiding stop, the longitudinal opening widening, upon application of the axial force to the guiding stop, to permit the guiding stop to clear the screw.

\* \* \* \* \*